United States Patent [19]
Haddenhorst

[11] 3,941,031
[45] Mar. 2, 1976

[54] PNEUMATIC CONTROLLER FOR CONTROLLING THE OPERATION OF AN AUTOMATIC MACHINE

[75] Inventor: Günter Haddenhorst, Dusseldorf-Gerresheim, Germany

[73] Assignee: Gerresheimer Glas Aktiengesellschaft, Duesseldorf-Gerresheim, Germany

[22] Filed: Nov. 30, 1973

[21] Appl. No.: 420,566

[30] Foreign Application Priority Data
Dec. 5, 1972 Germany............................ 2259413

[52] U.S. Cl. ............................... 91/6; 91/36; 91/37; 91/413; 137/624.18
[51] Int. Cl.² ......................................... F01B 25/02
[58] Field of Search ................... 137/624.2, 624.18; 91/411 R, 37, 6, 36, 413; 65/160, 161, 164, 209, 242; 60/421

[56] References Cited
UNITED STATES PATENTS

| | | | |
|---|---|---|---|
| 1,611,063 | 12/1926 | Peiler | 65/161 X |
| 2,634,751 | 4/1953 | Borer | 91/6 X |
| 2,665,251 | 1/1954 | Mendenhall | 137/624.2 X |
| 3,069,860 | 12/1962 | Colchagoff et al. | 91/36 |

FOREIGN PATENTS OR APPLICATIONS

| | | | |
|---|---|---|---|
| 264,396 | 1/1927 | United Kingdom | 137/624.2 |
| 615,336 | 1/1949 | United Kingdom | 137/624.18 |

*Primary Examiner*—William L. Freeh
*Assistant Examiner*—Edward Look
*Attorney, Agent, or Firm*—Toren, McGeady and Stanger

[57] ABSTRACT

A controller for controlling the operation of an automatic machine which includes a number of pneumatically operated devices, for example a machine for blow moulding hollow glass articles, comprises a closed box containing a number of valves each of which is arranged to control one of the pneumatically operated devices of the machine. A first compressed air supply system is connected to the box for supplying compressed air to some only of the valves in the box, the remaining valves being shut-off from this system, and a second compressed air supply system is provided for supplying these remaining valves which are not supplied by the first system. Pressure relief means is also provided for de-pressurising one of the systems so that the valve supplied by this system and the devices which they control become inoperative while the other valves remain pressurised by the other system and accordingly the devices controlled by these other valves remain operative.

4 Claims, 4 Drawing Figures

PNEUMATIC CONTROLLER FOR CONTROLLING THE OPERATION OF AN AUTOMATIC MACHINE

This invention relates to controllers for controlling the operation of automatic machines which include a number of fluid actuated elements which may comprise pneumatically operated devices. The controller is particularly intended for controlling an automatic machine for making hollow glass articles in which both a parison mould and a blow mould are opened and closed and various other functions are controlled by pneumatic cylinders or other pneumatic devices. The controller can also be used, however, for controlling other automatic machines.

One well known type of machine for manufacturing hollow glass articles is known as an IS-type machine and these machines operate either on what is known as a blow-and-blow cycle or on what is known as a press-and-blow cycle. These machines are controlled by a valve unit comprising a box containing a series of valves which individually actuate the various pneumatically operated devices which cause the machine to function. The valves are actuated in timed sequence by means of a rotating drum which has a series of buttons mounted on it in such a way that the buttons can be adjusted in position circumferentially around the drum. The buttons operate the valves mechanically as the drum rotates. As the valves are opened and closed in sequence by the buttons, compressed air flows through the valves and thence to the devices which cause the machine to function. The time-control valves are correlated both in relation to different sections of the machine and also in relation to a feeder so that the machine and its feeder operate automatically as a whole assembly.

During maintenance work on the machine or when a mould die of the machine has to be changed, the operator carrying out the maintenance work or changing the mould die runs the risk of being burnt by a hot part of the machine or of having his hands crushed between moving parts of the machine if some of the pneumatically operated devices are inadvertently set in operation while the work on the machine is going on. To obviate this danger, in existing machines it is necessary for all the operating devices to be brought into an idle condition and it must be ensured that it is impossible for further molten glass to be fed to the machine.

Until now with the machines of the IS-type all of the various parts of the machine have had to be stopped in a safety position when the mould dies are changed or other maintenance work is carried out. Because of this, it is necessary to render idle a scoop of the machine immediately after the scoop has delivered a molten glass gob into a blank mould of the machine so that there is no further gob delivery into the machine after the blank mould has ceased to operate and in this way the operator is prevented from suffering burns. Next, after a baffle has settled on to the blank mould, this entire section of the machine is rendered idle. At this stage of the shutting down of the machine, the timing drum of each individual section of the machine is in such a position that no valve in the valve box can be actuated by its button and consequently all further movement of the machine parts is prevented. Furthermore, with the timing drum in this position both the blank mould and a blow mould of the machine are closed and blow heads and baffle arms rest on the mould blocks and plungers or thimbles are in a press or counter-blow position. In order to replace or service a mould die with the parts of the machine stopped in these positions, it is necessary to actuate some of the valves by hand in order to open the mould to give access to the requisite mould dies. Even when the drum is in the safety position therefore quite a number of accidents, which are sometimes severe, still occur owing to movement of the drum caused by failure of brake or for other reasons. Such a movement of the drum causes the buttons to actuate valves which cause parts of the machine to move and it is this that brings about injury.

If an accident does occur, for example if an operator's hand is squeezed between the parts of a mould, which may be heated to a temperature of up to about 964°F, it is only possible to open the mould again in conventional machines if at least six of a total number of nineteen valves in the valve unit are actuated. Moreover, owing to the construction of the machine, it is impossible for the injured operator to free himself. Outside help from someone who is familiar with the operation of the machine is essential and this not only takes time, but also gives rise to other difficulties in so far as the victim of the injury is often caught in such a position that he makes it difficult for his rescuer to reach the timing drum and thus the rescue work is still further impeded.

A final point with conventional machines of the IS-type is that when mould die replacement takes place, the working temperature of those dies which remain in the machine are very much reduced owing to the complicated and lengthy operation necessary to set the drum in the safety position. Therefore when production from the machine starts again, these dies have to be reheated by the hot glass until the operating temperature is reached once again. A further considerable loss of production is incurred before the working temperature is re-established.

It is an object of this invention to provide a controller for controlling the operation of an automatic machine which includes a number of pneumatically operated devices, and in particular an automatic machine of the IS-type, which will permit the replacement of parts of the machine and other maintenance operations to be carried out more quickly than has previously been possible in order to reduce production losses and also to give greater safety to those carrying out the operations.

To this end, according to this invention, such a controller comprises a closed box containing a number of valves each of which is arranged to control one of the pneumatically operated devices of the machine, a first compressed air supply system connected to the box for supplying compressed air to some only of the valves in the box, a second compressed air supply system supplying those valves which are not supplied by the first system, and pressure relief means for de-pressurising one of the systems and thus the valves supplied by it, while the other valves remain pressurised by the other system.

With the aid of this controller, it is possible to disconnect some of the valves from the normal compressed air supply system so that the devices in the machine to which they are connected are de-pressurised and to feed other selected valves from the system which is not de-pressurised.

The valves which are disconnected and de-pressurised are in practice those valves which, when opened, deliver compressed air to devices which bring about functions which are dangerous for the operators during maintenance or replacement of parts of the machine. These valves are now completely relieved of pressure by the pressure relief means since they are no longer capable of operating the devices in any way. Thus even if further rotation of the timing drum takes place, in the case of a machine of the IS-type, thus causing buttons to actuate the valves, these valves no longer respond. In this way the risk of causing injury to the operators by moving parts of the machine is eliminated.

The valves which are supplied with compressed air by the first system are preferably shut-off from the box by means of shut-off sleeves which extend around the valves within the box.

The pressure relief means is preferably a change-over valve connected to a pressure relief opening and the change-over valve may be in the form of a four-way valve which is connected to an air supply line of one of the systems and also to connecting lines of a third ancillary compressed air system. The connecting lines are then arranged to be connected to selected devices of the machine. The selected devices are those which have to have air under pressure supplied to them to cause them to operate to bring the parts of the machine into the positions necessary to carry out maintenance work or to replace parts such as mould dies. In order to prevent air from flowing back along the connecting lines of the ancillary system when the machine is in normal operation and air is being supplied from the valves in the box, the connecting lines are preferably provided with non-return valves preventing back-flow towards the four-way valve.

The second compressed air system may have a supply line which is separate from, and does not communicate with a supply line of the first compressed air system or alternatively the second compressed air system may have a supply line which branches from a supply line of the first compressed air system upstream of the four-way valve.

In one example of the invention the box of the valve unit is divided by a partition into two chambers. One group of the valves in the box is then contained in one chamber and a second group of the valves in the box are contained in the other chamber. One compressed air system is then connected to one chamber and the second system is connected to the other chamber.

The valves in the two groups are then selected in such a way that one group causes the pneumatically operated devices of the machine to move the parts of the machine in a direction which cannot cause injury while the other group moves the parts of the machine in a dangerous direction, for example the valves in one group may be arranged to open the moulds of a machine of the IS-type and the other group then operates the devices which close the moulds.

When the box is divided in this way, the system which leads to the chamber containing the valves bringing about mould closure operations is provided with the four-way valve which is in a line which is branched off from a supply line which supplies the ancillary system leading to the connecting lines or which lead to the devices for opening the moulds in the case of a machine of the IS-type. During replacement or maintenance of the mould dies, the four-way valve is changed-over so that the chamber which contains the valves for bringing about the mould closure operations is de-pressurised. Once this has been done, should the timing drum for any reason continue to rotate thus causing the buttons on it to actuate the valves, nothing will happen because the valves are de-pressurised.

The four-way valve may be a solenoid valve and in a preferred arrangement, the four-way valve, whether a solenoid valve or not, is provided with two manual actuating members, one on each two opposite sides of the controller so that, in use, the actuating members are situated one at the front and the other at the rear of the machine to which the controller is connected. It is thus possible to effect a changeover of the four-way valve from the front and the back of the machine and this is a great advantage if, in spite of the provision of a controller in accordance with the invention an accident still occurs.

Some examples of controllers which are constructed in accordance with the invention and are intended for controlling an automatic machine for making hollow glass articles, will now be described with reference to the accompanying drawings in which.

Figure 1:
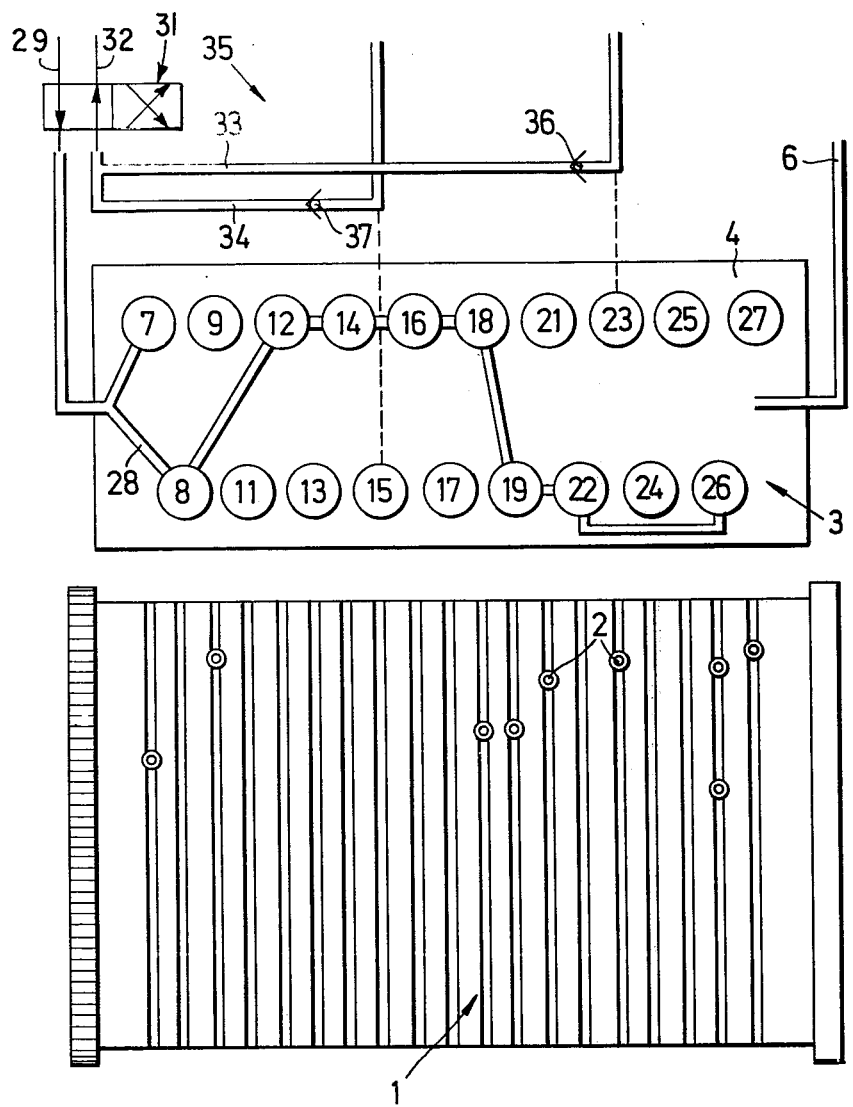
FIG. 1 is a diagramatical illustration of one example.

In all of the examples, the controller comprises valve control means such as a timing drum 1, which is rotated by a driving mechanism which is not shown. The timing drum 1 carries a series of operating buttons 2 which are mounted on the drum in such a way that they can be adjusted in position circumferentially. Each of the buttons 2 is arranged to actuate one of the valves of a plurality of fluid control valves of a valve unit 3. The valve unit 3 comprises a closed box 4 which is fed with compressed air through a supply line 6 of a first compressed air system. Arranged inside the box 4 are valves 7, 8, 9, 11 to 19, and 21 to 27 which are divided into a first and second plurality of such valves, for reasons more fully explained hereinafter. These valves are connected by pressure lines which are schematically shown with various fluid actuated elements of the automatic machine such as schematically indicated pneumatic cylinders 100 of machine components and tools in order to operate these devices as necessary to control the machine.

In the first example shown in FIG. 1, the second plurality of the valves, namely 7, 8, 12, 14, 16, 18, 19, 22 and 26 are connected to each other and are connected through a line 28 to a compressed air supply line 29 of a second compressed air system. The air supply line 29 is provided with a built-in four-way valve 31, to which a relief line 32 and two connecting lines 33 and 34, of an ancillary compressed air system 35 are connected. In this example, the connecting lines 33 and 34 lead to the opening pneumatic cylinders of a parison mould and a blow mould of the automatic machine. These opening cylinders are not shown, but are normally controlled by the valves 15 and 23 by means of the connecting lines shown in dotted lines.

Figure 4:
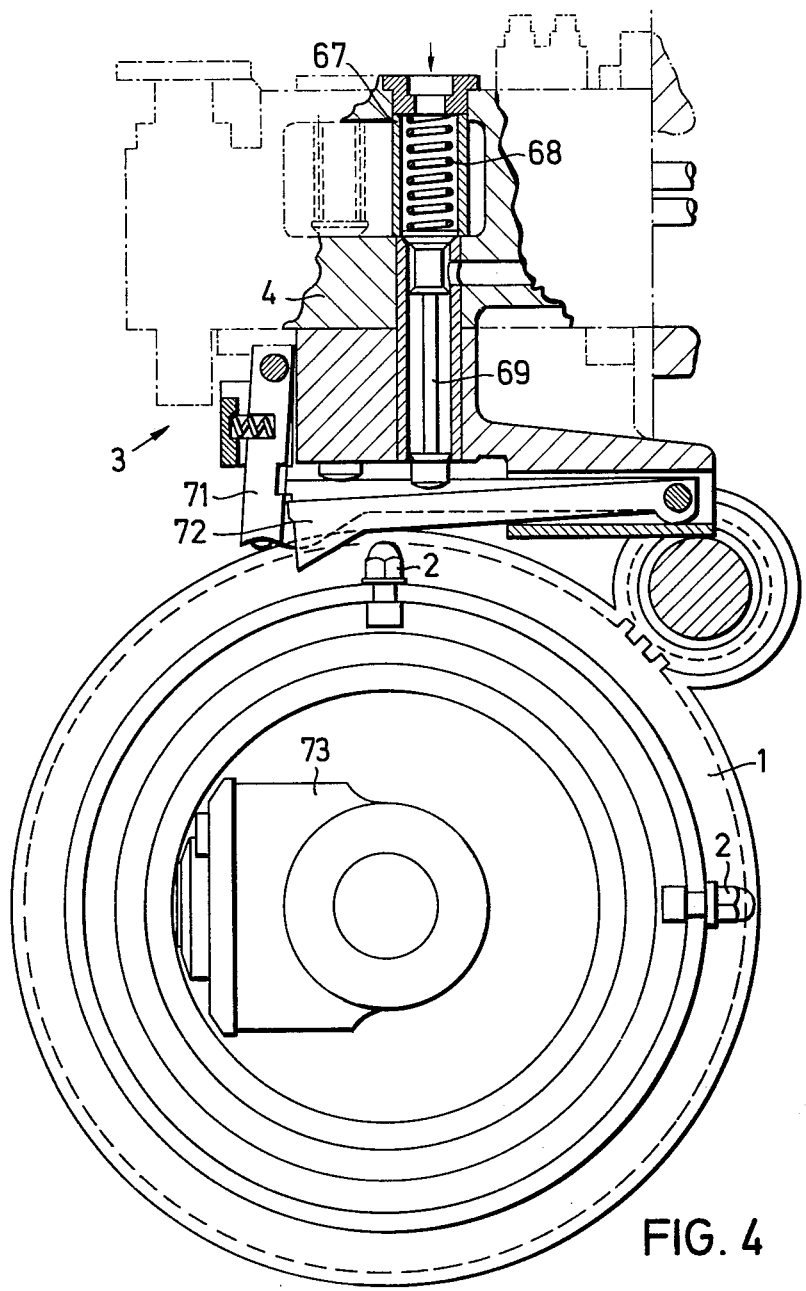
FIG. 4 is a cross sectional view of parts of the controller which are common to all three examples.

To prevent a back-flow of air from the opening cylinders of the blank mould and the blow mould during normal operation, non-return valves 36 and 37 are provided in the connecting lines 33 and 34. The four-way valve 31 is arranged so that it normally permits the flow of compressed air from the supply line 29 to the collecting line 28 and thence to the valves 7, 8, 12, 14, 16, 18, 19, 22 and 26. Each of these valves is shut-off from the interior of the box 4 by means of a shut-off sleeve which is shown in FIG. 4 so that no compressed air can pass from one compressed air system to the other, that is from the system supplied through the line 6 into the system supplied by the line 29 or vice versa. Under normal operating conditions, the interior of the box 4 is supplied with compressed air through the line 6 of the first compressed air system. All of the valves of the unit 3 can be actuated to a pre-set timing programme by means of the buttons 2 on the timing drum 1, each valve being actuated by the button each time the button reaches the valve as the drum 1 rotates. In this way the operating devices of the machine are controlled on a time basis.

When any of the operating devices have to be replaced or serviced it is necessary to prevent the possibility of an accident occuring owing to the continued operation of any of the valves in the unit 3 by their buttons 2 as the drum 1 continues to rotate. For this purpose, the four-way valve 31 is changed over. After the change-over the second plurality of valves 7, 8, 12, 14, 16, 18, 19, 22 and 26 which had previously been connected to the supply line 29 are now connected to the pressure relief line 32 so that these valves and the pressure lines connected to them and leading to some of the operating devices of the machine 2 become de-pressurised. These de-pressurised valves are therefore no longer capable of causing any movement of the devices to which they are connected even if they should be actuated by their buttons 2.

The interconnected series of valves which can be de-pressurised in this way are in the particular example of an automatic machine for blowing hollow glass articles connected to devices which bring about various operations of the machine as follows:

Valve 7 - scoop out;
Valve 8 - blank mould closure;
Valve 12 - funnel off;
Valve 14 - baffle off;
Valve 16 - neckring inversion;
Valve 18 - neckring reversion;
Valve 19 - blowhead off;
Valve 22 - blow mould closure;
Valve 26 - take-out on.

Thus the devices for bringing about all these operations are de-pressurised when the four-way valve 31 is in its safety position and therefore none of the devices can be operated. The remaining valves of the valve unit 3 which comprise the first plurality of fluid control valves of the system, although still supplied with compressed air from the line 6 of the first compressed air system, are only connected to those devices of the machine which cannot bring any occurrences which are dangerous for the operator of the machine even if the drum 1 continues to rotate. When the valve 31 is in its changed-over safety position, the connecting lines 33 and 34 are supplied with compressed air from the supply line 29 of the second compressed air system so that these cylinders are operated to enable the moulding dies in these two moulds to be replaced.

Figure 2:
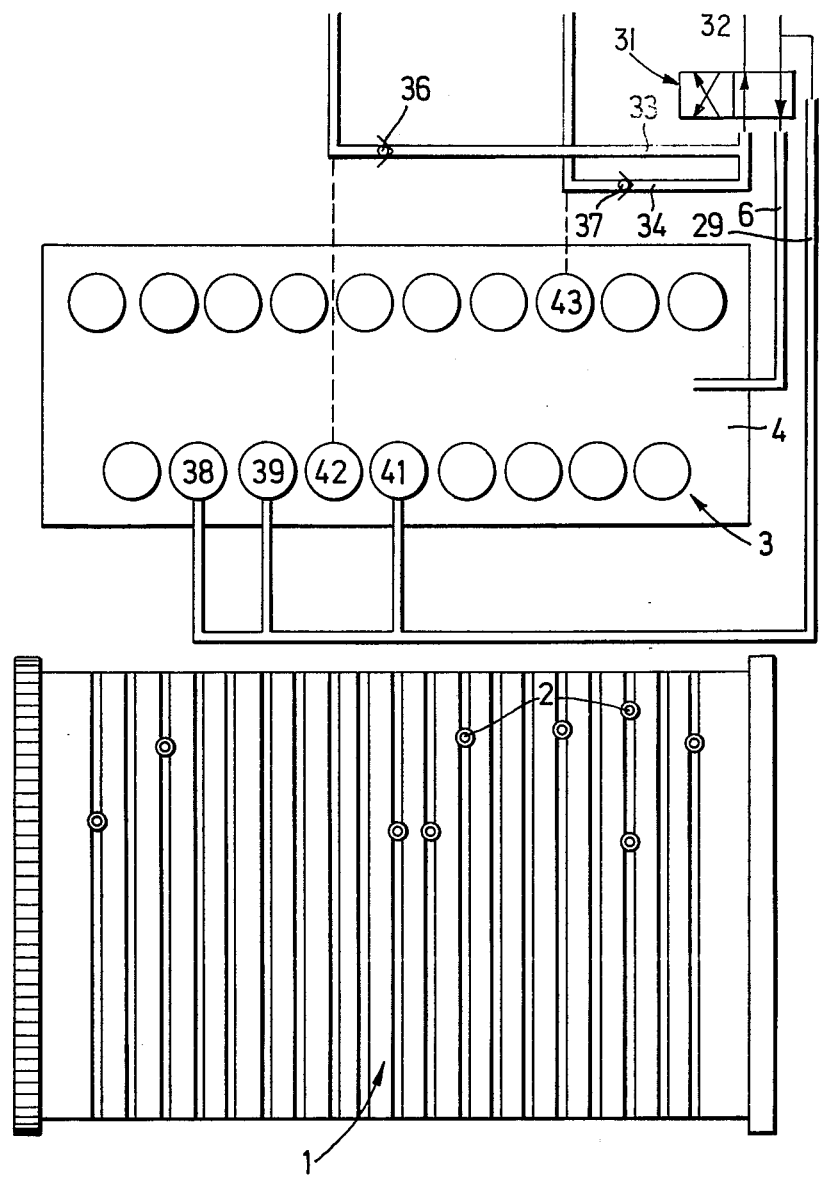
FIG. 2 is a diagramatical illustration of a second example.

The example shown in FIG. 2 also comprises a timing drum 1 with buttons 2, a valve unit 3 having a closed box with a compressed air supply line 6 of a first compressed air system and a supply line 29 of a second compressed air system. The example also has a four-way valve 31 leading to a relief line 32 and connecting lines 33 and 34 with non-return valves 36 and 37. However, in this example, the compressed air supply line 29 branches from the supply line 6 upstream of the four-way valve 31 so that it by-passes this valve. The valve unit 3 has the same number of valves as in the example shown in FIG. 1 but the valves are connected to operating devices of the machine which perform different functions and for this reason those valves which are relevant to the description of this example have been given new reference numerals.

The compressed air supply line 29 leads to valves 38, 39 and 41 and these valves are connected to devices which perform the following functions:

Valve 38 - plunger down;
Valve 39 - plunger up;
Valve 41 - neckring open.
Valves 42 and 43 control pneumatic cylinders which open the blank mould and the blow mould respectively.

In normal operation, compressed air flows through the four-way valve 31 and through the supply line 6 into the interior of the box and within the box flows to the valves 42 and 43 and to the valves which have no reference numerals. The valves 38, 39 and 41 are shut-off from the interior of the box 4 by means of shut-off sleeves in the same way as were some of the valves in the first example. The valves which are shut-off are permanently supplied with compressed air from the supply line 29 of the second compressed air system. During normal operation, all of the valves are actuated on a time basis by the buttons 2 of the drum 1 so that compressed air is fed to the individual operating devices of the machine as necessary to cause the machine to operate.

When it is necessary to clean or replace the mould dies of the machine, the four-way valve 31 is again changed-over so that compressed air is no longer supplied through the supply line 6, but is fed to the supply lines 33 and 34 in order to operate the opening cylinders of the blank mould and the blow mould of the machine as in the first example. At the same time the reversal of the four-way valve 31 causes the supply line 6 to be connected to the relief line 32 so that the interior of the box 4 is de-pressurised. The supply of compressed air to the valves 38, 39 and 41 through the line 29 is maintained so that the devices to which these valves are connected are still fed with compressed air as may be necessary to enable the replacement or cleaning of the mould dies to take place. These operating devices are such that even if the rotation of the drum 1 continues, the opening of their air supply valves cannot cause any danger to the operator of the machine. All the valves which actuate devices which might cause danger are depressurised so that no accident can occur.

Figure 3:
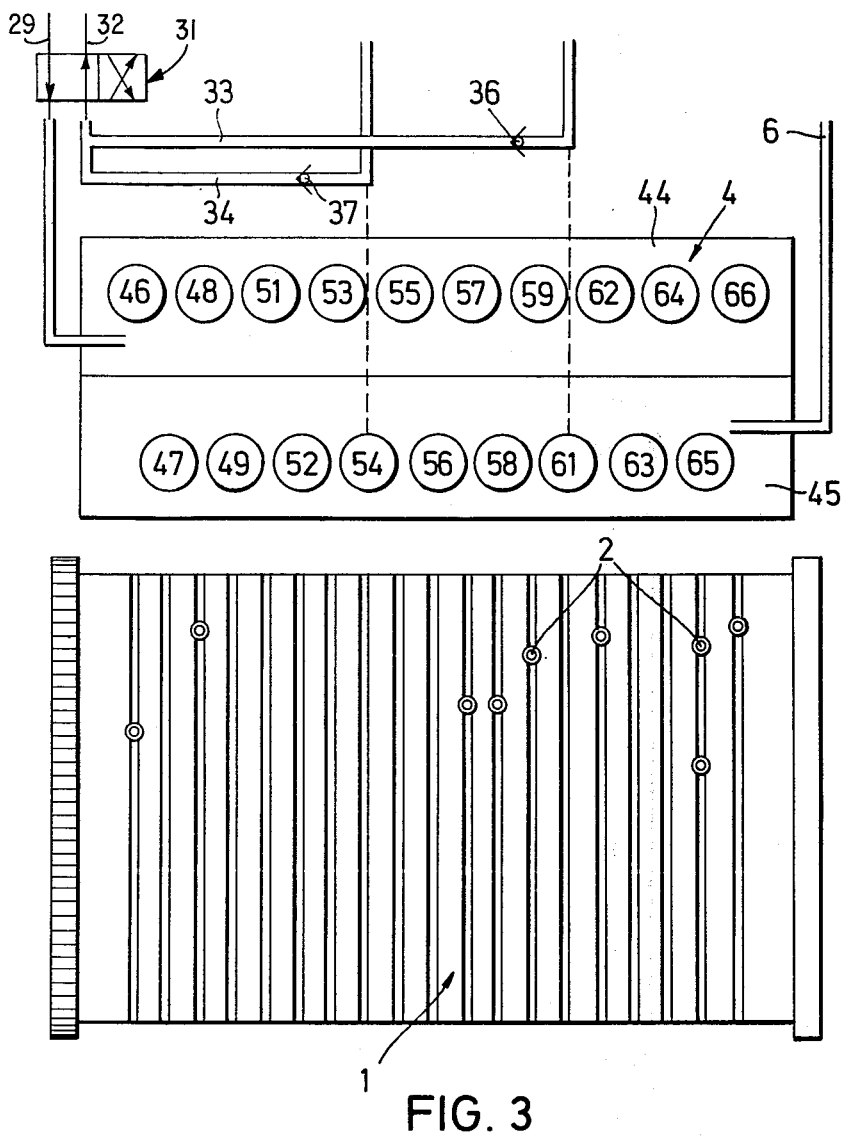
FIG. 3 is a diagramatical illustration of a third example.

In the third example shown in FIG. 3, the box 4 is divided by a longitudinal partition into tow separate chambers 44 and 45. The supply line 6 of the first compressed air system leads to the chamber 45 and the supply line 29 of the second compressed air system leads to the second chamber 44. In other respects the arrangement of the compressed air supply systems is similar to that described with reference to FIGS. 1 and 2. The connections of the individual valves to the operating devices of the machine are, however, different and the operations brought about by the various valves are therefore once again set out. The valves within the upper chamber 44 fulfill the following functions:

Valve 46 - scoop;

Valve 48 - blank mould closure;
Valve 51 - funnel down;
Valve 53 - baffle down;
Valve 55 - neckring inversion;
Valve 57 - neckring reversion;
Valve 59 - blowhead off;
Valve 62 - blow mould closure;
Valve 64 - tongs on;
Valve 66 - blow moulding.

The valves in the chamber 45 actuate the devices which bring about the following functions:-
Valve 47 - thimble;
Valve 49 - plunger;
Valve 52 - counter-blow;
Valve 54 - baffle opening;
Valve 56 - neckring opening;
Valve 58 - alternative;
Valve 61 - blow mould opening;
Valve 63 - alternative;
Valve 65 - take-out tongs.

Thus the chamber 45 accommodates those valves which, when actuated by the buttons 2 under normal operating conditions effect the opening of the blank mould, blow mould, neckring and take-out tongs, movement of the thimble and plunger and counter-blowing of the hollow glass article. These are valves having an affect on the operations which take place in opening of the moulds. On the other hand, the valves accommodated in the chamber 44 effect the closing of the moulds, that is the extension of the scoop, closing of the blank mould and closing of the blow mould, inverting the parison held by the neckring from the blank mould to the blow mould, lowering the blow head on to the blow mould and blow moulding the parison to obtain a finished container or other hollow glass article as well as extending the take-out tongs which remove the blown article from the blow mould.

During maintenance or replacement of the moulding dies, the chamber 44 is de-pressurised after the four-way valve 31 has been changed over so that the valves in this chamber are also de-pressurised. Consequently, the devices which are operated by these valves cannot be supplied with compressed air so that no operations of the machine which are dangerous to the operator can come about. This precludes any risk of accident by unintentional closing or other dangerous movements of individual parts of the dies or of the machine. At the same time the supply of compressed air through the supply line 29 is stopped and compressed air is conveyed into the connecting lines 33 and 34 so that the opening cylinders of the blank mould and the blow mould of the machine are at once operated to open the moulds. In this way the downtime of the machine necessary for replacing or maintaining the mould dies is substantially reduced which in turn leads to a considerable increase in the output of the machine.

FIG. 4, which is an end view of the drum 1 and a section at right angles to the drum 1 through the valve unit 3, shows how a shut-off sleeve 67 is installed within the box 4. One of the valves in the unit which is shown in the section has a stem 69 arranged to be moved upwards against the action of a return spring 68 by means of a pivoted lever 72 which is in turn acted upon by one of the buttons 2. When the lever 72 is moved up by the button 2, it is held in position by a locking lever 71 which forms a catch and the locking lever is subsequently released when required by another button 2. A brake 73 is provided for stopping the timing drum 1 when the controller is put out of operation.

Of course the connections between the various valves and the individual components and operating devices of the machine described are only by way of example and the valves can be connected in other ways.

I claim:

1. In an fluid controlled device for controlling a machine which includes a plurality of fluid actuated elements, a valve assembly having a first and a second plurality of fluid control valves, and means individually connecting each of said fluid control valves to one of said fluid actuated elements of said machine to enable actuation thereof through said control valves, the improvement comprising:
   a first pressurized fluid supply system for supplying fluid under pressure to said first plurality of fluid control valves;
   a second pressurized fluid supply system for supplying fluid under pressure to said second plurality of fluid control valves;
   valve control means for individually operating each of said valves of said first and said second plurality of fluid control valves to enable selected actuation of said fluid actuated elements by supply thereto of pressurized fluid through said fluid controlled device;
   venting valve means connected within said second pressurized fluid supply system to depressurize said second system thereby to prevent pressurized fluid from being supplied to said second plurality of fluid controlled valves normally supplied by said second system while enabling said first supply system to supply pressurized fluid to said first plurality of fluid control valves; said venting valve means including a four-way valve, said second pressurized fluid supply system connected to said four-way valve, means connecting said four-way valve to said second plurality of fluid control valves, vent means connecting said four-way valve to vent the pressure fluid supplied thereto in order to divert said fluid from said second plurality of fluid control valves, said four-way valve operating to switch said pressurized fluid supply between said second vent means and said second plurality of fluid control valves; and
   an ancillary fluid supply system coupling said four-way valve with selected ones of said fluid actuated devices normally supplied with actuating fluid through said first plurality of fluid controlled valves to enable actuation of said selected fluid actuated devices directly from said second pressurized fluid supply system through said four-way valve when said four-way valve is switched to vent said pressure fluid supply to prevent said fluid from being supplied to said second plurality of fluid control valves.

2. A device according to claim 1 wherein said valve assembly comprises a closed box having said first pressurized fluid supply system connected thereto fore supplying pressurized fluid to said first plurality of fluid control valves, and wherein said device further includes a plurality of shut-off sleeves, with one of said shut-off sleeves being provided to extend around each of the valves of said second plurality of fluid control valves in order to isolate said valves of said second plurality of pressure control valves from said closed box.

3. A device according to claim 2 including partition means dividing said closed box into a first and a second chamber, said first plurality of fluid control valves being contained in said first chamber and said second plurality of fluid control valves being contained in said second chamber, and means connecting said first pressurized fluid supply to said first chamber and said second pressurized fluid supply system to said second chamber.

4. A device according to claim 1 including connecting lines connecting said four-way valve to each of said selected ones of said fluid actuated devices, said device further comprising a non-return valve in each of said connecting lines, said nonreturn valves being arranged to prevent back-flow in said connecting lines from said selected fluid actuated devices toward said four-way valve.

* * * * *